United States Patent
Neufeld et al.

(10) Patent No.: US 7,222,809 B1
(45) Date of Patent: May 29, 2007

(54) BAIL ASSEMBLY FOR SPINNING REEL

(75) Inventors: Henry L. Neufeld, Tulsa, OK (US); Christopher S. Littau, Bartlesville, OK (US); Josh Denton, Broken Arrow, OK (US); Kent Zwayer, Tulsa, OK (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 0 days.

(21) Appl. No.: 11/273,601

(22) Filed: Nov. 14, 2005

(51) Int. Cl.
*A01K 89/01* (2006.01)

(52) U.S. Cl. ................................ 242/230; 242/231

(58) Field of Classification Search ............... 242/230, 242/231, 232, 233
See application file for complete search history.

(56) References Cited

U.S. PATENT DOCUMENTS

| | | | |
|---|---|---|---|
| 3,670,984 A * | 6/1972 | Lemery ................. 242/231 |
| 3,834,644 A * | 9/1974 | Stackawicz ............ 242/231 |
| 4,509,705 A | 4/1985 | Councilman et al. |
| 4,650,134 A | 3/1987 | Councilman |
| 4,792,106 A | 12/1988 | Hlava |
| 4,824,040 A | 4/1989 | Carpenter et al. |
| 4,921,188 A | 5/1990 | Smith |
| 5,040,743 A | 8/1991 | Zurcher et al. |
| 5,154,369 A | 10/1992 | Smith |
| 5,443,571 A | 8/1995 | Kang |
| 5,613,645 A | 3/1997 | Carpenter et al. |
| 5,620,149 A | 4/1997 | Zurcher et al. |
| 5,667,159 A | 9/1997 | Carpenter et al. |
| 5,669,565 A | 9/1997 | Zurcher et al. |
| 5,713,529 A | 2/1998 | Atherton et al. |
| 5,848,757 A * | 12/1998 | Amano et al. ............ 242/231 |
| 5,868,331 A * | 2/1999 | Shinohara et al. ........ 242/231 |
| 5,934,586 A | 8/1999 | Kang et al. |
| 6,056,220 A | 5/2000 | Cockerham et al. |
| 6,056,221 A | 5/2000 | Stiner |
| 6,076,756 A | 6/2000 | Cockerham et al. |
| 6,082,649 A | 7/2000 | Smith et al. |
| 6,186,429 B1 | 2/2001 | Cockerham |
| 6,220,537 B1 * | 4/2001 | Amano et al. ............ 242/231 |
| 6,257,513 B1 | 7/2001 | Cockerham et al. |
| 6,264,125 B1 | 7/2001 | Cockerham et al. |
| 6,267,311 B1 | 7/2001 | Stiner et al. |
| 6,283,393 B1 | 9/2001 | Kang |
| 6,572,042 B2 * | 6/2003 | Sugawara ................ 242/231 |
| 6,595,449 B2 * | 7/2003 | Ikuta et al. ............. 242/231 |
| 6,769,639 B2 | 8/2004 | Koelewyn et al. |
| 6,899,295 B2 * | 5/2005 | Okada et al. ............ 242/231 |
| 7,007,880 B2 * | 3/2006 | Ikuta ....................... 242/230 |
| 7,077,349 B2 * | 7/2006 | Sugawara ................ 242/231 |

* cited by examiner

*Primary Examiner*—Emmanuel M Marcelo
(74) *Attorney, Agent, or Firm*—Fellers, Snider, Blankenship, Bailey & Tippens

(57) ABSTRACT

An improved bail assembly for a spinning reel which, in one aspect includes a bail arm with a roller hood having an outer converging end portion wherein a bail wire extends from the converging end portion in an initial substantially straight manner such that there are no bends in the bail wire in proximity to the roller hood. In another aspect, the improvement comprises a converging extension piece which extends from the bail arm, the bail wire extending from the extension piece in a substantially straight manner such that there are no bends in proximity to the extension piece. The extension piece preferably also constitutes a connector for the bail wire which is effective for reducing corrosion of the bail assembly.

19 Claims, 4 Drawing Sheets

BAIL ASSEMBLY FOR SPINNING REEL

FIELD OF THE INVENTION

The present invention relates to an improved bail assembly for a spinning-type fishing reel.

BACKGROUND OF THE INVENTION

Spinning-type fishing reels are well known in the art. A spinning reel typically comprises: a housing; an oscillating spool at the forward end of the housing; a rotatable crank handle extending from the housing; a rotor which rotates about the spool by cooperative movement with the crank handle; and a bail assembly which is mounted on the rotor and operates to wind the fishing line onto the oscillating spool. The rotor typically comprises a pair of ears which are positioned on opposite sides of the spool.

The bail assembly of a spinning reel typically comprises a U-shaped bail wire which is connected between a pair of bail arms. The bail arms are pivotably connected to the rotor ears so that the bail wire and bail arms can be pivoted together between (a) an open position for casting wherein the fishing line is permitted to feed off of the outer end of the spool and (b) a closed position for reeling wherein the bail assembly winds the fishing line back onto the oscillating spool as the user turns the crank handle. To facilitate the wrapping of the fishing line onto the oscillating spool, the bail assembly will also typically include a line roller which receives and guides the fishing line onto the spool during the reeling operation. The roller is typically located either between the bail wire and the forward portion of one of the bail arms or is located within the bail arm itself. In either case, the bail wire will typically be attached above the line roller such that the bail wire initially projects laterally outward with respect to the rotational axis of the line roller. The bail wire typically then includes a rather sharp bend (sometimes approaching as much as 90°) in close proximity to the line roller and the bail arm. Next, the bail wire extends in a substantially uniform U-shape to the bail arm on the other side of the reel. Examples of the prior art bail assemblies are disclosed in U.S. Pat. No. 6,257,513 and U.S. Pat. No. 6,056,221, each of which is incorporated herein by reference in its entirety.

Various problems are commonly experienced when using the spinning reel bail assemblies heretofore available in the art. To alleviate these problems, a need exists for an improved spinning reel bail assembly which will: provide improved fishing line management; assure that the fishing line is always properly received on the line roller for the reeling operation so that the line does not cut into the bail arm or the bail wire; and prevent the fishing line from snagging or looping. In addition, a need exists, particularly in regard to the use of flexible bail wires, for an improved bail assembly which: reduces the potential for breakage at the bail wire connection points; prevents bail wire breakage by eliminating bends and/or other areas of fatigue; and reduces the potential for corrosion at the bail wire connection points.

SUMMARY OF THE INVENTION

The present invention satisfies the needs and alleviates the problems discussed above. In one aspect, there is provided an improvement for a spinning reel bail assembly having a bail wire and a pivotable bail arm assembly comprising a bail arm and a line roller. The improvement comprises: the pivotable bail assembly including a roller hood at a forward portion of the pivotable bail arm assembly; the roller hood having a converging end portion from which the bail wire extends; and the bail wire extending from the converging end portion of the roller hood in an initial substantially straight manner such that the bail wire has no bends therein outside of the roller hood in proximity to the converging end portion.

In another aspect, there is provided an improvement in a spinning reel bail assembly having a pivotable bail arm and a bail wire wherein the improvement comprises an extension piece connected to the bail arm, at least a portion of the extension piece having an outwardly converging shape and extending from the bail arm. The improvement further comprises the bail wire extending from the extension piece in an initial substantially straight manner such that the bail wire has no bends outside of the bail arm in proximity to the extension piece.

In another aspect, there is provided an improvement in a spinning reel bail assembly having a pivotable bail arm and bail wire wherein the improvement comprises a connector for the bail wire attached to the bail arm, the connector preventing the bail wire from directly contacting the bail arm and the connector being formed of a material effective for reducing corrosion of the bail assembly.

Further aspects, features, and advantages of the present invention will be apparent to those of ordinary skill in the art upon examining the accompanying drawings and upon reading the following detailed description of the preferred embodiments.

DETAILED DESCRIPTION OF THE PREFERRED EMBODIMENTS

Figure 1:
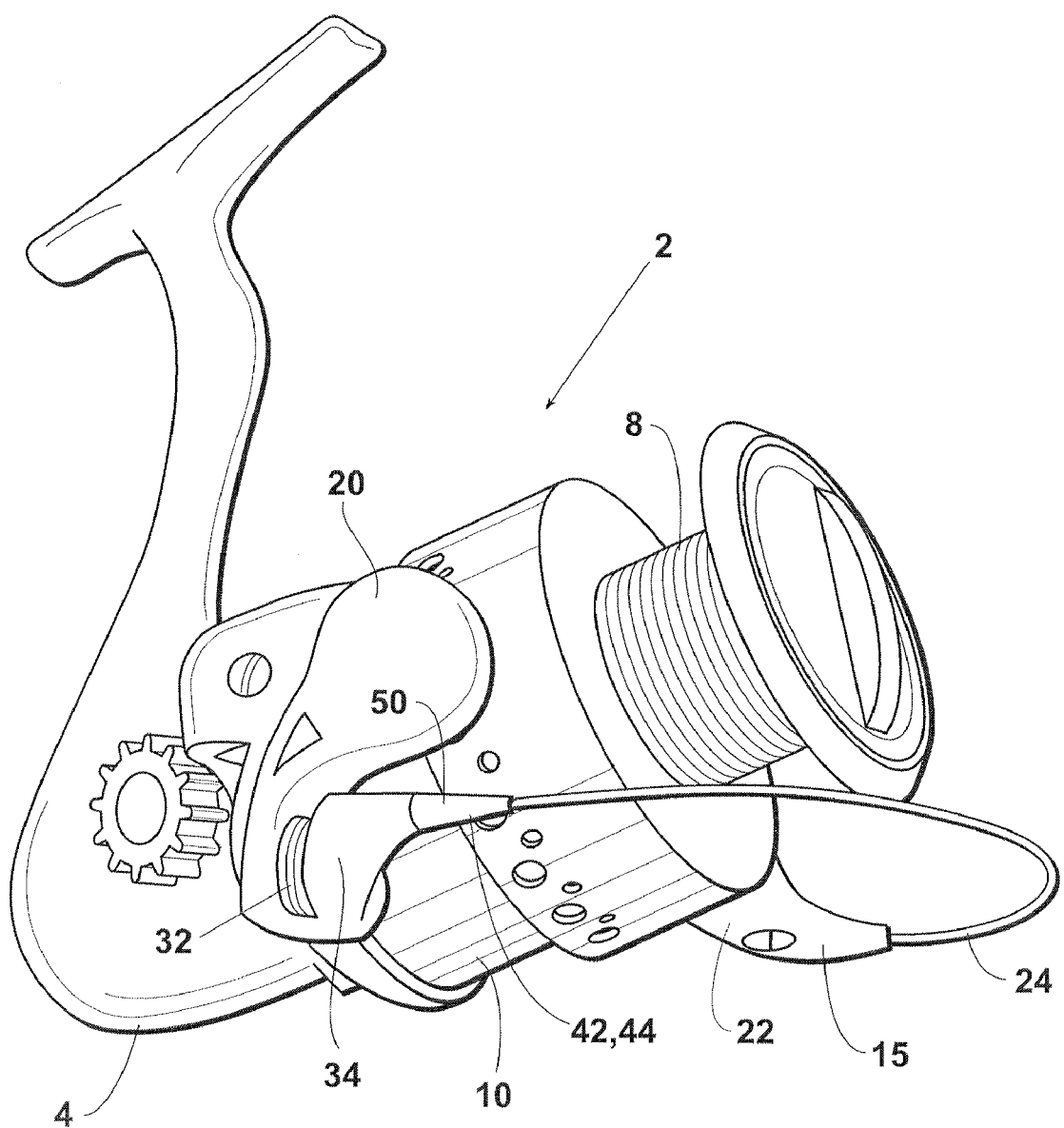
FIG. 1 is a perspective view of an embodiment 2 of the improved spinning reel provided by the present invention wherein the inventive bail assembly 15 thereof is shown in an open position for casting.
Figure 2:
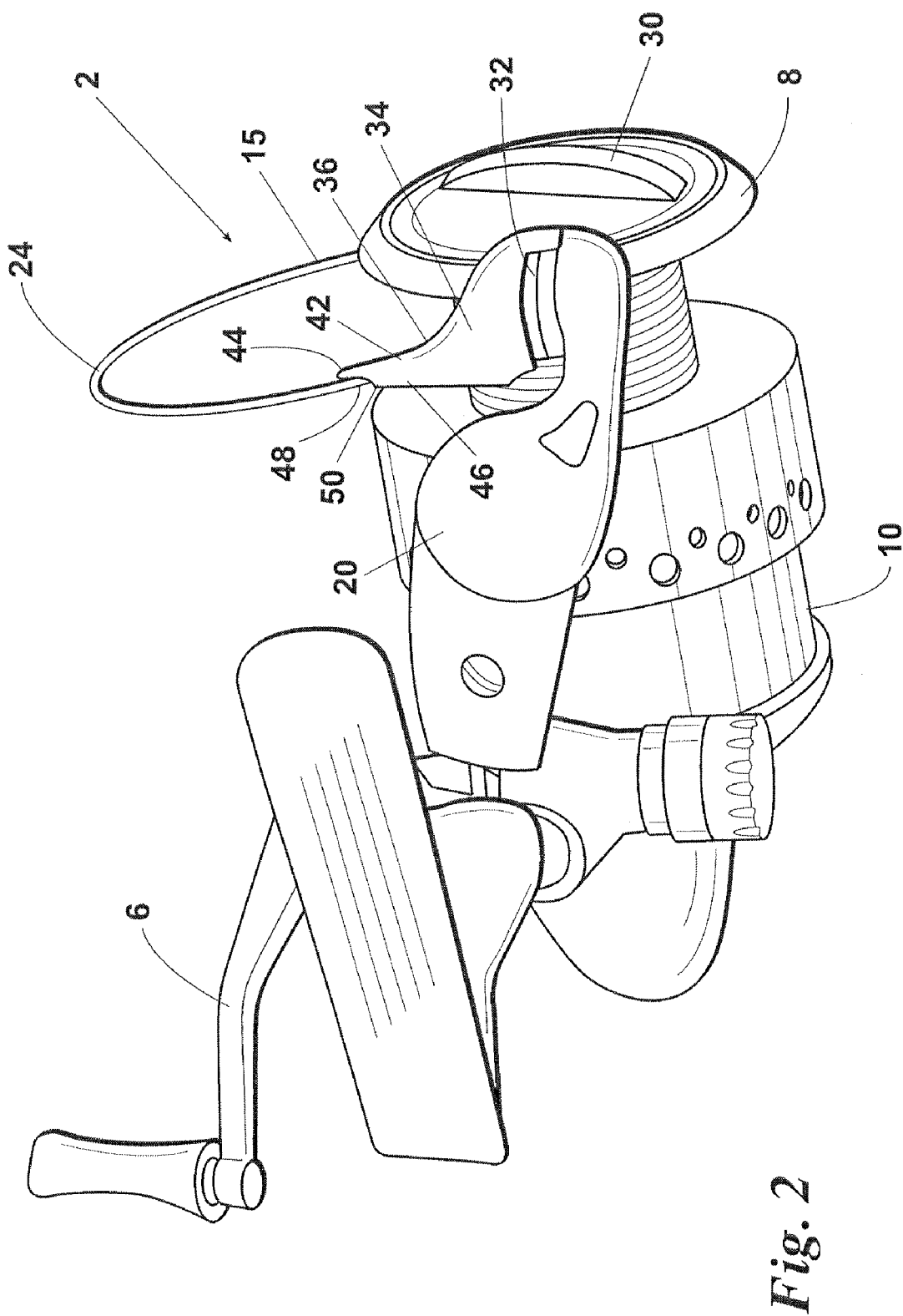
FIG. 2 is a perspective view of the spinning reel 2 wherein the inventive bail assembly 15 is shown in a closed position for reeling in the fishing line.
Figure 3:
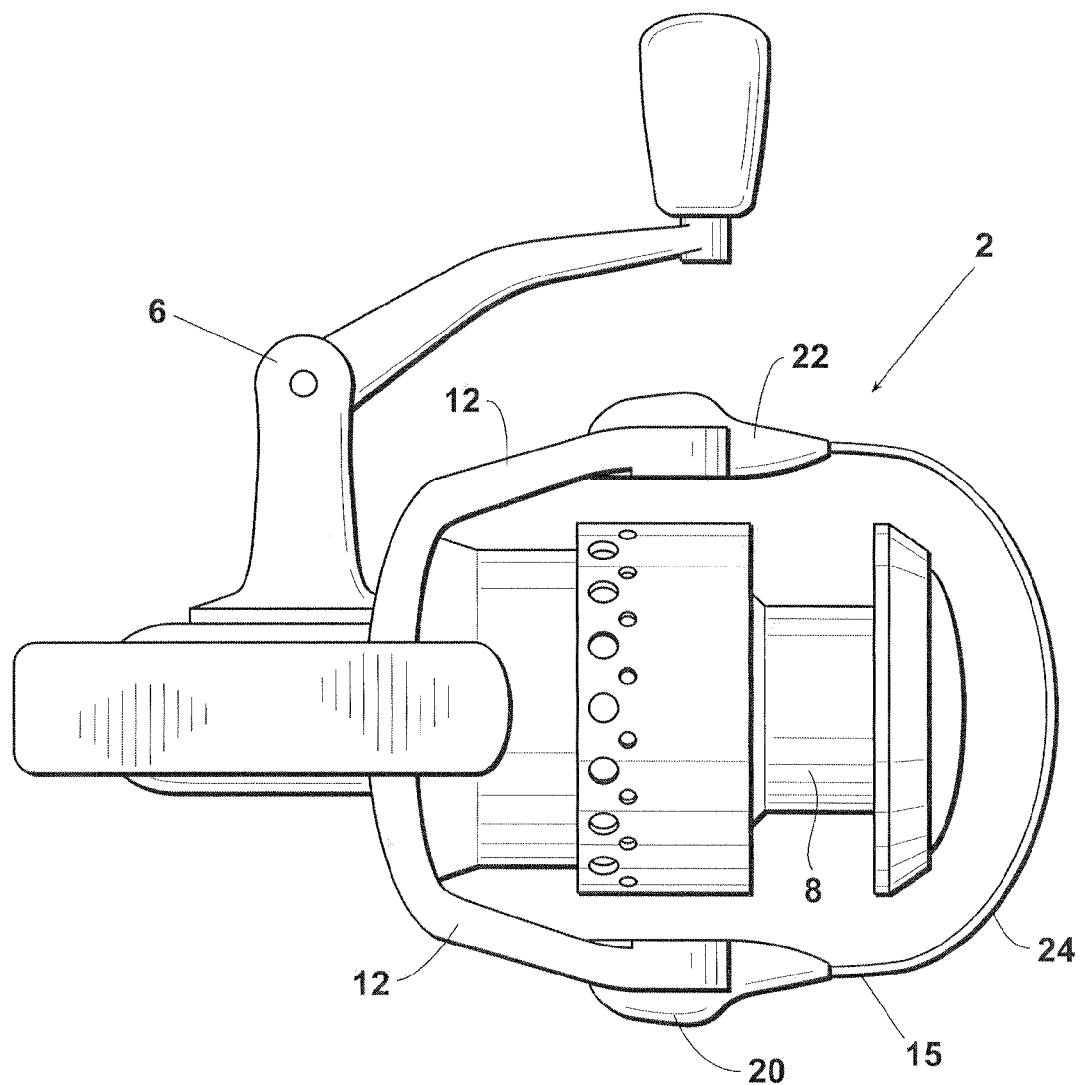
FIG. 3 is a plan view of the spinning reel 2.
Figure 4:
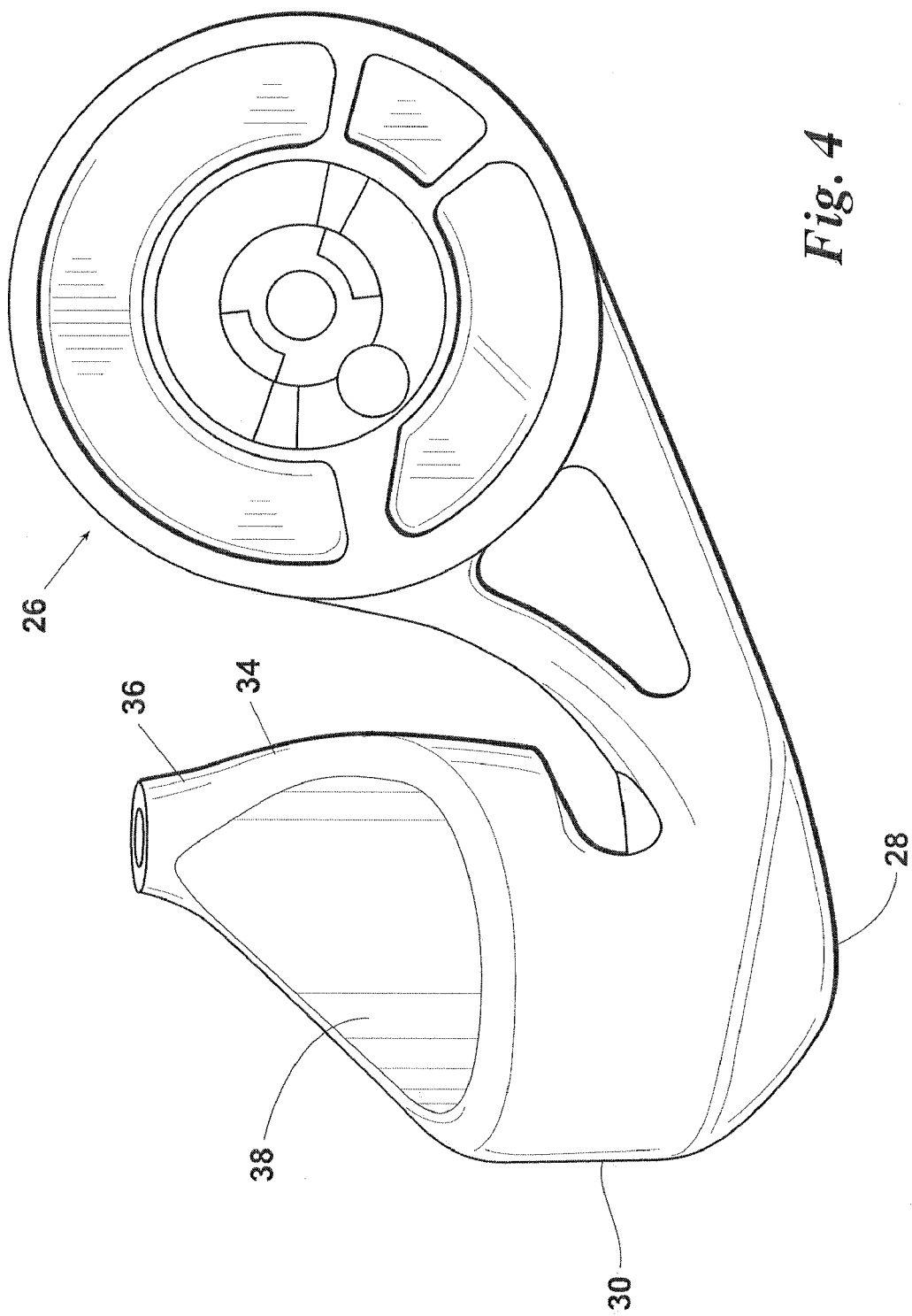
FIG. 4 is an elevational side view of a bail arm 26 of the inventive bail assembly 15.

An embodiment 2 of the improved spinning reel provided by the present invention is shown in FIGS. 1–3. The spinning reel 2 comprises: a housing 4 wherein the various operating mechanisms (not shown) of the spinning reel are located; a crank handle 6 which is rotatably mounted through the side of the housing 4 for operating the mechanisms within the housing; an oscillating spool 8 located at the forward end of the housing 4; a rotor 10 which includes a pair of forwardly projecting ear structures 12; and an embodiment 15 of the inventive pivotable bail assembly attached to the rotor 12. When the user turns the crank handle 6, the operating mechanisms within housing 4 operate in a known manner to (a) cause the bail assembly 15 to pivot from a casting position as shown in FIG. 1 to a reeling position shown in FIG. 2; (b) cause the oscillating spool 8 to move back and forth; and (c) cause the bail assembly 15 secured to the rotor 10 to rotate around the oscillating spool 8 and to thereby wind the fishing line onto the spool.

The inventive bail assembly 15 preferably comprises: a bail arm assembly 20 which is pivotably connected to one of the rotor ears 12; a bail arm 22 which is pivotably connected to the other rotor ear 12; and a generally U-shaped bail wire 24 which extends from the bail arm assembly 20 to the other bail arm 22. Although not required by the present invention, the bail wire 24 will preferably be formed of a material which provides sufficient stiffness to accommodate the basic functions of the bail wire, but has enough flexibility to allow temporary deflections. The flexible bail wire 24 will most preferably be a super-elastic, light weight bail wire of the type described in U.S. Pat. No. 6,257,513 which is formed from a titanium alloy. The bail wire 24 is most preferably formed from a nickel-titanium alloy such as NITINOL.

To assist in line management and to greatly reduce or eliminate snagging, looping, and other problems, the bail arm assembly 20 of the inventive bail assembly 15 preferably comprises: a pivotable bail arm 26 having a rounded bottom contour 28 at the forward end portion 30 thereof; a line roller 32 rotatably mounted in the forward end portion 30 of the bail arm 26; and a roller hood 34 which is positioned on top of the line roller 32 and includes an outwardly converging end 36 from which the bail wire 24 extends. The roller hood 34 is preferably integrally formed on the forward end portion 30 of the bail arm 26 but can alternatively be a separate component.

To eliminate obstructions on the bottom of the bail arm 26 which could contribute to line snagging or other problems, an aperture 38 is preferably provided through the top of the forward end portion 30 of the bail arm 26 for receiving the line roller 32. The line roller 32 is removably retained within the forward end portion 30 of the bail arm 26 by a screw or a bolt which is also received through the aperture 38. The roller hood 34 has an outwardly converging, laterally curved shape which partially surrounds the upper roller aperture 38 for the bail arm 26. In addition, when the inventive bail assembly 15 is in the open position shown in FIG. 1, the bail arm assembly 20 is nested in the rotor ear attachment in a highly retracted position to further prevent looping, snagging and other problems.

To also assist the fishing line in transitioning onto and off of the line roller 32 for reeling and casting operations, the bail wire 24 of the inventive bail assembly 20 extends in an initial substantially straight manner from the outer converging end 36 of the roller hood 34. Thus, in further contrast to the bail assemblies heretofore used in the art, there are no bends in the bail wire 24 outside of the roller hood 34 in proximity to the outer end 36 of the hood 34. The absence of any bend in the bail wire 24 in proximity to the roller hood 34 also eliminates what has heretofore been an area of significant fatigue and breakage, particularly for flexible bail wires.

Also in accordance with the present invention, the inventive bail assembly 15 preferably includes an extension piece 42 which includes at least an outer portion 44 having a base end 46 located at the outer converging end 36 of the roller hood 34 and an outer end 48. The bail wire 24 preferably extends in an initial substantially straight manner from the extension piece 42 such that there are no bends in the bail wire 24 outside of the roller hood 34 in proximity to the extension piece 42. In addition, in order to further assist in guiding the fishing line onto and off of the roller hood 34 and the line roller 32, the outer portion 44 of the extension piece 42 preferably converges from the base end 46 to the outer end 48 thereof and preferably has at least a partial conical shape. The outer portion 44 of the extension piece 42 preferably also includes a flat side 50 which inclines inwardly as it extends from the base end 46 to the outer end 48.

Although the extension piece 42 can consist entirely of the outer portion 44 which is positioned against the outer end of the roller hood 34, the extension piece 42 will more preferably be a connector piece which is inserted into the outer converging end 36 of the roller hood 34 and operates to hold and connect the end of the bail wire 24 such that the bail wire 24 does not directly contact the roller hood 34. The connector 42 will thus provide additional support at the point of connection of the bail wire 24 to the bail arm assembly 20 in order further reduce the potential for fatigue and breakage. In addition, in order to reduce or eliminate corrosion problems which can occur as a result of using a flexible bail wire 24 having a composition which is significantly different that of the roller hood 34 and/or bail arm 26, the connector 42 can desirably be formed of a material such as stainless steel which will reduce or substantially prevent the potential for corrosion. As will be understood by those in the art, the bail arm 26 and/or roller hood 34 will typically be formed of an aluminum material which can create a significant corrosion potential if maintained in direct contact with a titanium alloy bail wire.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. In a bail assembly for a spinning reel having a bail wire and a pivotable bail arm assembly comprising a bail arm and a line roller, the improvement comprising:

said pivotable bail arm assembly including a roller hood at a forward portion of said pivotable bail arm assembly;

said roller hood having a converging end portion from which said bail wire extends; and said bail wire extending from said converging end portion of said roller hood in an initial substantially straight manner such that said bail wire has no bends therein outside of said roller hood in proximity to said converging end portion; and further comprising an extension piece, at least a portion of said extension piece having an outwardly converging shape and extending outwardly from said converging end portion of said roller hood, said bail wire extending from said extension piece in an initial substantially straight manner such that said bail wire has no bends outside of said roller hood in proximity to said extension piece.

2. The bail assembly of claim 1 wherein the improvement further comprises said portion of said extension piece having at least a partial conical shape.

3. The bail assembly of claim 1 wherein the improvement further comprises:

said portion of said extension piece having a base end adjacent to said converging end portion of said roller hood;

said extension piece having an outer end; and said portion of said extension piece converging from said base end to said outer end.

4. The bail assembly of claim 3 wherein the improvement further comprises said portion of said extension piece having a flat side extending from and inclining inwardly from said base end to said outer end.

5. The bail assembly of claim 1 wherein the improvement further comprises:
said bail wire being a flexible bail wire.

6. The bail assembly of claim 5 wherein the improvement further comprises said bail wire being formed of a titanium alloy material.

7. The bail assembly of claim 6 wherein the improvement further comprises said extension piece being formed of stainless steel.

8. The bail assembly of claim 7 wherein the improvement further comprises said bail arm being formed of aluminum.

9. In a bail assembly for a spinning reel having a bail wire and a pivotable bail arm assembly comprising a bail arm and a line roller, the improvement comprising:
said pivotable bail arm assembly including a roller hood at a forward portion of said pivotable bail arm assembly;
said roller hood having a converging end portion from which said bail wire extends; and
said bail wire extending from said converging end portion of said roller hood in an initial substantially straight manner such that said bail wire has no bends therein outside of said roller hood in proximity to said converging end portion; and
wherein said roller hood is integrally formed as part of said bail arm.

10. The bail assembly of claim 9 wherein the improvement further comprises said line roller being received through an aperture in said bail arm which is partially surrounded by said roller hood.

11. In a bail assembly for a spinning reel having a pivotable bail arm and a bail wire, the improvement comprising:
a roller hood connected to said bail arm, at least a portion of said roller hood having an outwardly converging shape and extending from said bail arm;
an extension piece connected to said roller hood, wherein the extension piece is a connector piece that is inserted into an outer converging end of said roller hood and operates to hold and connect an end of said bail wire such that the bail wire does not directly contact the roller hood;
said bail wire extending from said extension piece in an initial substantially straight manner such that said bail wire has no bends outside of said bail arm in proximity to said extension piece.

12. The bail assembly of claim 11 wherein the improvement further comprises a portion of said extension piece having at least a partial conical shape.

13. The bail assembly of claim 11 wherein the improvement further comprises:
a portion of said extension piece having a base end adjacent to said bail arm;
said extension piece having an outer end; and
said portion of said extension piece converging from said base end to said outer end.

14. The bail assembly of claim 13 wherein the improvement further comprises said portion of said extension piece having a flat side extending from and inclining inwardly from said base end to said outer end.

15. The bail assembly of claim 11 wherein the improvement further comprises said bail wire being a flexible bail wire.

16. The bail assembly of claim 11 wherein the improvement further comprises said extension piece preventing said bail wire from directly contacting said bail arm and said extension piece being formed of a material effective for reducing corrosion of said bail assembly.

17. The bail assembly of claim 16 wherein the improvement further comprises said bail wire being formed of a titanium alloy material.

18. The bail assembly of claim 17 wherein the improvement further comprises said extension piece being formed of stainless steel.

19. The bail assembly of claim 18 wherein the improvement further comprises said bail arm being formed of aluminum.

* * * * *